(12) United States Patent
Yokoo

(10) Patent No.: US 11,951,873 B2
(45) Date of Patent: Apr. 9, 2024

(54) CONTINUOUSLY ADAPTABLE BRAKING PEDAL MAP SYSTEM

(71) Applicant: Toyota Motor Engineering & Manufacturing North America, Inc., Plano, TX (US)

(72) Inventor: Takehito Yokoo, Aliso Viejo, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 509 days.

(21) Appl. No.: 17/217,477

(22) Filed: Mar. 30, 2021

(65) Prior Publication Data

US 2022/0314810 A1 Oct. 6, 2022

(51) Int. Cl.
*B62D 6/10* (2006.01)
*B60L 7/16* (2006.01)
*B60L 7/26* (2006.01)

(52) U.S. Cl.
CPC ............ *B60L 7/16* (2013.01); *B60L 7/26* (2013.01); *B60L 2240/421* (2013.01); *B60L 2240/423* (2013.01); *B60L 2250/26* (2013.01)

(58) Field of Classification Search
CPC ........ B60L 7/16; B60L 7/26; B60L 2240/421; B60L 2240/423; B60L 2250/26
USPC ............ 303/3, 15, 20, 152; 180/65.1, 65.26, 180/65.285, 65.51; 701/22, 70–72
See application file for complete search history.

(56) References Cited

U.S. PATENT DOCUMENTS

| | | | |
|---|---|---|---|
| 5,915,801 A | 6/1999 | Taga et al. | |
| 8,376,476 B2 | 2/2013 | Ikeda et al. | |
| 9,630,508 B2* | 4/2017 | Gabor | B60L 7/12 |
| 10,293,817 B2 | 5/2019 | Tanase et al. | |
| 11,597,283 B2* | 3/2023 | Suzuki | B60L 7/18 |
| 11,660,967 B2* | 5/2023 | Murawski | B60L 7/22 |
| | | | 701/22 |
| 2008/0100129 A1 | 5/2008 | Lubbers | |
| 2011/0251770 A1 | 10/2011 | Minarcin et al. | |
| 2012/0139329 A1* | 6/2012 | Fabini | B60T 7/042 |
| | | | 303/3 |
| 2013/0297164 A1* | 11/2013 | Lauffer | B60W 10/18 |
| | | | 701/70 |
| 2014/0333123 A1 | 11/2014 | Kunz et al. | |

(Continued)

FOREIGN PATENT DOCUMENTS

DE 102016206786 10/2017

OTHER PUBLICATIONS

International Search Report and Written Opinion, PCT/US2022/022645, Korean Intellectual Property Office, dated Aug. 1, 2022, 11 pages.

*Primary Examiner* — Christopher P Schwartz
(74) *Attorney, Agent, or Firm* — SNELL & WILMER LLP

(57) ABSTRACT

Methods, systems, and apparatus for a continuously adaptable braking pedal system. The braking system includes an electric motor that is configured to generate regenerative energy and provide a regenerative braking torque. The braking system includes an electronic control unit coupled to the electric motor. The electronic control unit is configured to determine an amount of the regenerative braking torque to be applied based on an adaptable pedal map and an amount of braking force. The electronic control unit is configured to control an amount of the regenerative braking torque to be applied.

17 Claims, 6 Drawing Sheets

(56) References Cited

U.S. PATENT DOCUMENTS

| | | | |
|---|---|---|---|
| 2015/0019058 A1* | 1/2015 | Georgiev | B60L 58/12 |
| | | | 701/22 |
| 2015/0291152 A1 | 10/2015 | Mould et al. | |
| 2017/0028871 A1 | 2/2017 | Fukudome | |
| 2017/0232959 A1 | 8/2017 | Bureau et al. | |
| 2018/0056987 A1 | 3/2018 | Suzuki et al. | |
| 2019/0389510 A1* | 12/2019 | Ogawa | B62D 6/10 |
| 2020/0070663 A1 | 3/2020 | Lahner | |
| 2022/0001749 A1* | 1/2022 | Ogawa | B60L 15/2009 |

* cited by examiner

CONTINUOUSLY ADAPTABLE BRAKING PEDAL MAP SYSTEM

BACKGROUND

Field

The present disclosure relates to systems, devices and/or methods for an adaptable braking pedal system that continuously adapts the pedal map based on operator or vehicle braking behavior.

Description of the Related Art

In vehicles with an electric powertrain, the electric motor may be used as a generator to charge the battery and provide electric braking. This allows the electric powertrain to recover some of the kinetic energy of the vehicle in order to recharge its batteries. The electric braking may be engaged when the brake pedal is depressed and/or when the accelerator pedal is released, such as when the vehicle is coasting. When the accelerator pedal is released and not engaged, the electric motor generates a regenerative braking torque that applies a deceleration drive force that reduces the speed of the vehicle. The deceleration drive force, however, is a constant or fixed deceleration drive force that reduces the speed of the vehicle. A driver, however, may prefer a more aggressive deceleration of the vehicle, which may cause the driver to depress the brake pedal, which causes wear and tear on the brake pads and other components of the vehicle. Moreover, a truck operator may expect a Jake Brake "feel," such as in a diesel experience, during coasting or deceleration, and so, the electric powertrain may need to simulate the Jake Brake "feel" for a more operator friendly and smoother operation of the vehicle.

Accordingly, there is a need for a system, device and/or method to provide or equip vehicles, such as an electric truck, with virtual Jake Brakes and/or allow a vehicle or a user to select or determine the amount to supplement braking with regenerative braking.

SUMMARY

In general, one aspect of the subject matter described in this disclosure may be embodied in a continuously adaptable braking pedal system (or "braking system"). The braking system includes an electric motor that is configured to generate regenerative energy and provide a regenerative braking torque. The braking system includes an electronic control unit coupled to the electric motor. The electronic control unit is configured to determine an amount of the regenerative braking torque to be applied based on an adaptable pedal map and an amount of braking force. The electronic control unit is configured to control an amount of the regenerative braking torque to be applied.

These and other embodiments may optionally include one or more of the following features. The braking system includes a brake pedal sensor. The brake pedal sensor is configured to detect a brake pedal position that corresponds to the amount of braking force. The amount of regenerative braking torque may be inversely proportional to the amount of braking force.

The braking system may include a memory. The memory may be configured to store multiple adaptable pedal maps. Each adaptable pedal map may have different mappings of regenerative braking torque, engine/motor speed and/or brake pedal position. The electronic control unit may be coupled to the memory and may be configured to select the adaptable pedal map from the multiple adaptable pedal maps. The electronic control unit may be configured to select the adaptable pedal map from the multiple adaptable pedal maps based on driver or vehicle behavior patterns.

The driver or vehicle behavior patterns may include a frequency of depression of a brake pedal. The electronic control unit may be configured to select the adaptable pedal map based on user input that indicates a selection of an amount of regenerative braking to be used. The braking system may include an inverter. The inverter may be coupled to the electric motor and configured to control the regenerative braking torque of the electric motor. The inverter may be configured to control the regenerative braking torque of the electric motor based on the amount of regenerative braking torque to be applied and convert alternating current (AC) obtained from the electric motor into direct current (DC) that is stored in a battery of the vehicle.

In another aspect, the subject matter may be embodied in a braking system. The braking system includes an electric motor that is configured to generate regenerative energy and provide a regenerative braking torque. The braking system includes an inverter coupled to the electric motor. The inverter is configured to control the regenerative braking torque of the electric motor. The braking system includes an electronic control unit coupled to the inverter. The electronic control unit is configured to determine an amount of the regenerative braking torque to be applied based on an adaptable pedal map and an amount of braking force. The electronic control unit is configured to provide a signal that indicates the amount of regenerative braking torque to be applied.

In another aspect, the subject matter may be embodied in a method for controlling a deceleration force of a vehicle. The method includes determining that the vehicle is coasting or decelerating. The method includes determining an adaptable pedal map from multiple adaptable pedal maps to be used to determine an amount of regenerative braking torque to be applied by a motor of the vehicle. The method includes determining the amount of regenerative braking torque to be applied based on the adaptable pedal map. The method includes controlling, using an inverter, the amount of regenerative braking torque.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices, vehicles and/or methods for implementing an adaptable pedal map that continuously changes to provide a regenerative braking torque and to provide a diesel driving experience or feel when using an electric power train, such as to simulate virtual Jake Brakes. Particular embodiments of the subject matter described in this disclosure may be implemented to realize one or more of the following advantages. The braking system uses a continuously adaptable pedal map, such as during deceleration or coasting, for an electric powertrain of a vehicle, such as a truck, to provide a diesel experience or feel to the operator. The continuously adaptable pedal map varies the regenerative braking torque and the corresponding deceleration drive force to provide the operator with a more friendly and smoother operation of the vehicle, especially for a truck operator that expects the feel of a Jake Brake. Thus, the regenerative braking torque and the corresponding deceleration drive force is variable and may be controlled.

Other benefits and advantages include the capability to change or adapt the amount of regenerative braking torque and/or regenerative braking (hereinafter, referred to as "regenerative braking") based on driver or vehicle behavior patterns. The braking system may adapt the amount of regenerative braking based on driver or vehicle behavior patterns, such as the frequency or regularity of the driver or vehicle applying the braking pedal, the frequency or regularity of the driver or vehicle activating the windshield wipers and/or the frequency or regularity of the driver or vehicle activating the Jake Brakes. For example, as a driver is more prone or likely to brake, such as when it is raining or traveling downhill, the braking system may increase the amount of regenerative braking so that the driver reduces the amount or frequency that the driver applies the brakes. This can be applicable to autonomous or semi-autonomous vehicles. For example, as a vehicle is more prone or likely to brake, such as when it is raining or traveling downhill, the braking system may automatically increase the amount of regenerative braking so that the vehicle reduces the amount or frequency that the vehicle applies the brakes.

Additionally, the braking system may change or adapt the amount of regenerative braking torque based on a user preference or comfort level. The braking system may receive user input that indicates the user preference or comfort level and adjust the frequency and amount of regenerative braking that is applied during deceleration and/or coasting of the vehicle.

Figure 1:
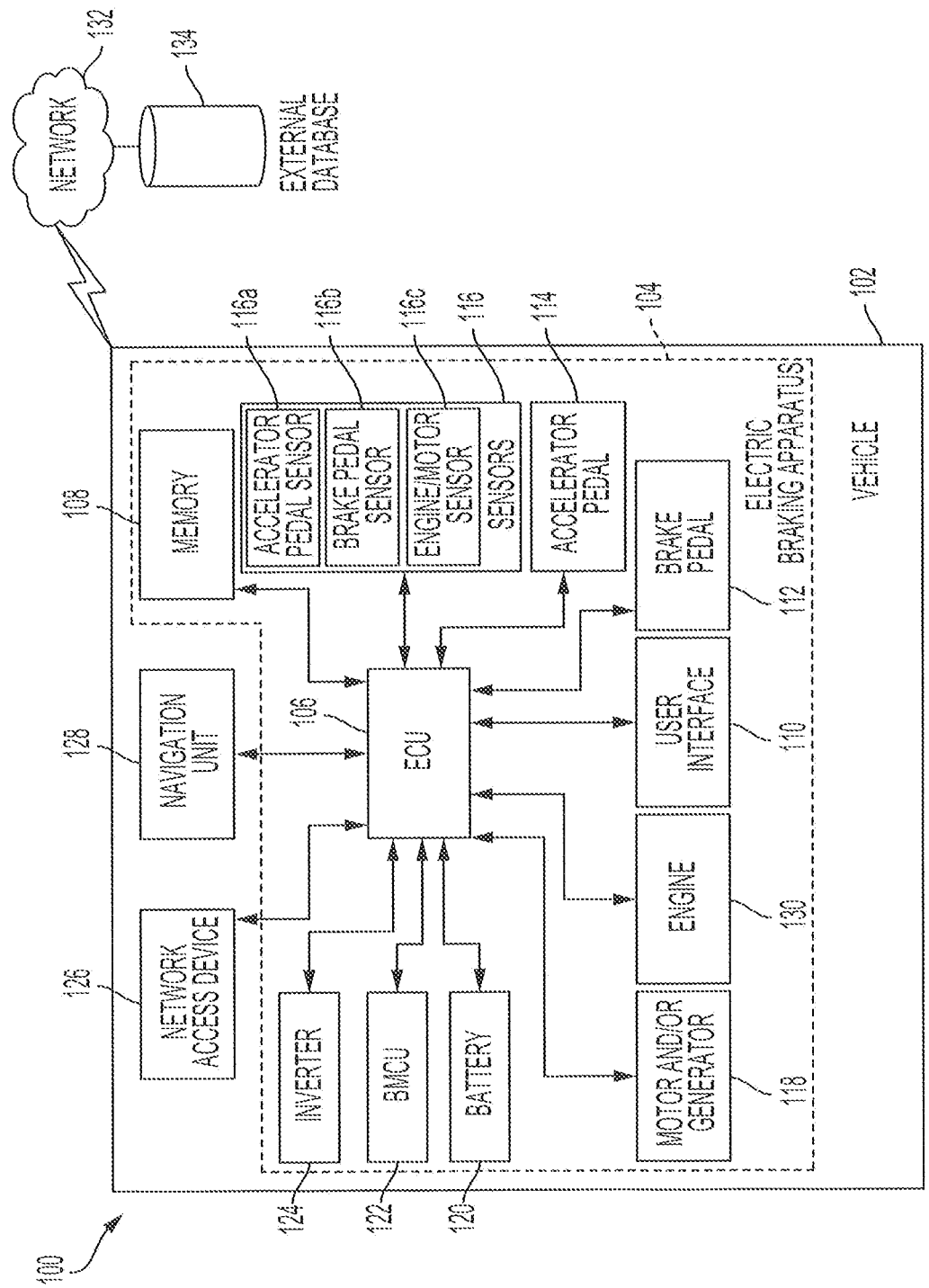
FIG. 1 is a block diagram of an example braking system according to an aspect of the invention.

FIG. 1 is a block diagram of a braking system 100. The braking system 100 may include a braking apparatus 104 that may retro-fitted, coupled to, include or be included within a vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous.

The braking system 100 monitors driver behavior patterns and/or user input and adjusts, controls or manages the electric motor or regenerative braking torque (hereinafter referred to as "regenerative braking torque") that is applied and that corresponds to a deceleration drive force to reduce or retard the movement of the vehicle during deceleration and/or coasting of the vehicle 102. The braking system 100 uses a continuously adaptable pedal map to adjust or control the amount of regenerative braking torque rather than a pedal map that applies a fixed or constant regenerative braking torque that corresponds to a fixed or a constant deceleration drive force. This provides for smoother operation of the vehicle 102 and a more operator friendly "feel" during regenerative braking and may train the driver to brake less frequently, which reduces the wear and tear to the brake pads and other brake and vehicle components.

The braking system 100 may have an electric braking apparatus (or "braking apparatus") 104. The braking apparatus 104 may be within the vehicle 102. The braking apparatus 104 may be within, coupled to or otherwise connected to the vehicle 102 and/or connected to other vehicle components. The braking apparatus 104 may include one or more processors, such as an electronic control unit (ECU) 106 or other processor and a memory 108. The braking apparatus 104 may include or be coupled to other vehicle components including a user interface 110, the brake pedal 112, the accelerator pedal 114, one or more sensors 116, the inverter 124, the engine 130, the battery management control unit 122, the battery 120 and/or the motor and/or generator 118. In some implementations, the braking apparatus 104 may include or be coupled to other components of the vehicle 102, such as the network access device 126 and/or the navigation unit 128.

The braking apparatus 104 may include an ECU 106. The ECU 106 may be implemented as a single ECU or as multiple ECUs. The ECU 106 may be electrically coupled to some or all of the other components within the vehicle 102, such as the motor and/or generator 118, the engine 130, the battery 120, the inverter 124, the battery management control unit (BMCU) 122, the memory 108, the network access device 126 and/or one or more sensors 116. The ECU 106 may include one or more processors or controllers specifically designed for monitoring driver behavior patterns and/or controlling the inverter 124 and/or the motor and/or generator 118 to adjust or control the regenerative braking torque and corresponding deceleration drive force. The ECU 106 may be coupled to the memory 108.

The memory 108 may be coupled to the ECU 106 and store instructions that the ECU 106 executes. The memory 108 may include one or more of a Random Access Memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106 or other processor.

The braking apparatus 104 may include a user interface 110. The braking apparatus 104 may display one or more notifications and/or alerts. The one or more notifications may notify the user of the amount of regenerative braking or regenerative braking torque that is being applied. The one or more notification may include the amount of regenerative energy that is being generated and/or the amount that the brake pedal 112 is depressed. The user interface 110 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 110 may receive user input that may include configuration settings for one or more user preferences that indicate the amount of regenerative braking to be applied during deceleration or coasting of the vehicle 102.

The braking apparatus 104 may include a brake pedal 112 and/or an accelerator pedal 114 of the vehicle 102. The brake pedal 112 when depressed may apply the brakes and cause the vehicle 102 to slow down and/or stop. The accelerator pedal 114 may control an amount of energy, such as gas or electrical energy, that is fed to the engine 130 or the motor and/or generator 118 to control the speed of the vehicle 102.

The braking apparatus 104 may include one or more sensors 116. The one or more sensors 116 include an accelerator pedal sensor 116a, a brake pedal sensor 116b and/or an engine/motor speed sensor 116c. The accelerator pedal sensor 116a detects or measures a position of the accelerator pedal 114 and may detect or measure a rate of change in the position of the accelerator pedal 114. The brake pedal sensor 116b detects or measures a position of the brake pedal 112 and may detect or measure a rate of change in the position of the brake pedal 112. The brake pedal sensor 116b may provide to an inverter the range of brake pedal stroke where regeneration may be maximized. The engine/motor speed sensor 116c may measure the engine/motor speed of the engine 130 and/or the motor and/or generator 118.

The motor and/or generator 118 may convert electrical energy into mechanical power, such as torque, and may convert mechanical power into electrical energy, such as via regenerative braking. The motor and/or generator 118 may be coupled to the battery 120 via the inverter 124. The motor and/or generator 118 may convert the energy from the battery 120 into mechanical power, and may provide energy back to the battery 120, for example via regenerative braking. The inverter 124 may convert direct current (DC) from the battery 120 into alternative current (AC) for the motor and/or generator 118 to power or move the wheels of the vehicle 102. The inverter 124 may convert the AC from the motor and/or generator 118 and that is produced via regenerative braking to DC to store in the battery 120. The wheels of the vehicle 102 may create torque to move the motor and/or generator 118 to provide the AC to the inverter 124 to convert into DC to be stored in the battery 120, e.g., when coasting or decelerating. The inverter 124 may control the variable regenerative braking torque of the electric motor that decelerates the vehicle 102 and the corresponding variable deceleration drive force.

In some implementations, the vehicle 102 may include one or more additional power generation devices such as the engine 130 or a fuel cell stack (not shown). The engine 130 combusts fuel to provide power instead of and/or in addition to the power supplied by the motor and/or generator 118.

The battery 120 may be coupled to the motor and/or generator 118 and may provide electrical energy to and receive electrical energy from the motor and/or generator 118. The battery 120 may include one or more rechargeable batteries.

The BMCU 122 may be coupled to the battery 120 and may control and manage the charging and discharging of the battery 120. The BMCU 122, for example, may measure, using battery sensors, parameters used to determine the state of charge (SOC) of the battery 120. The BMCU 122 may control the battery 120 to maintain a reserve power explicitly for providing a sudden burst of electrical energy to be converted into power for the transmission to drive or move the multiple wheels of the vehicle 102.

The braking system 100 may include a network access device 126. The network access device 126 may be coupled to or included within the braking apparatus 104. The network access device 126 may include a communication port or channel, such as one or more of a Dedicated Short-Range Communication (DSRC) unit, a Wi-Fi unit, a Bluetooth® unit, a radio frequency identification (RFID) tag or wader, or a cellular network unit for accessing a cellular network (such as 3G, 4G or 5G). The network access device 126 may transmit data to and receive data from the entities and/or components via a network 132. The network 132 may be a Dedicated Short-Range Communication (DSRC) network, a local area network (LAN), a wide area network (WAN), a cellular network, the Internet, or combination thereof, that connects, couples and/or otherwise communicates among the multiple entities.

The braking system 100 may include or be coupled to an external database 134, such as via the network 132. A database is any collection of pieces of information that is organized for search and retrieval, such as by a computer or a processor, and the database may be organized in tables, schemas, queries, reports, or any other data structures. A database may use any number of database management systems. The external database 134 may include a third-party server or website that stores or provides information. The information may include real-time information, periodically updated information, or user-inputted information. A server may be a computer or a processor in a network that is used to provide services, such as accessing files or sharing peripherals, to other computers in the network.

The external database 134 may be a navigational map database that includes navigational map information. The navigational map information may include weather features, such as precipitation including ice, snow or rain, and/or road features, such as highways, roadways, dirt roads, inclines, off-ramps, on-ramps, stop, yield or other traffic signals or signs or changes in gradation in the roadways that may affect driver behavior patterns or affect when a vehicle may coast, decelerate and/or accelerate. These road features may affect the driver behavior patterns, such as cause a driver to slow, coast or depress the brake pedal 112, and as such, the braking apparatus 104 may account or anticipate these changes to change or adjust the adaptable pedal map while driving.

The braking system 100 may include a navigation unit 128. The navigation unit 128 may be integral to the vehicle 102 or a separate unit coupled to the vehicle 102. In some implementations, the vehicle 102 may include a Global Positioning System (GPS) unit (not shown) for detecting location data and date/time information instead of the navigation unit 128. In that regard, the ECU 106 may perform the functions of the navigation unit 128 based on data received from the GPS unit. At least one of the navigation unit 128 or the ECU 106 may predict or propose a route set that includes a starting location and a destination location. The navigation unit 128 or the ECU 106 may perform navigation functions. Navigation functions may include, for example, route and route set prediction, providing navigation instructions, and receiving user input such as verification of predicted routes and route sets or destinations.

The navigation unit 128 may provide and obtain navigational map information. The navigational map information may include a timestamp, a current location, a direction of travel, one or more road features, a starting location, a destination location and/or a route between the starting location or current location and the destination location of the vehicle 102 and may include a memory (not shown) for storing route data. The navigation unit 128 may receive data from other sensors capable of detecting data corresponding to location information. For example, the other sensors may include a gyroscope or an accelerometer.

Figure 2:
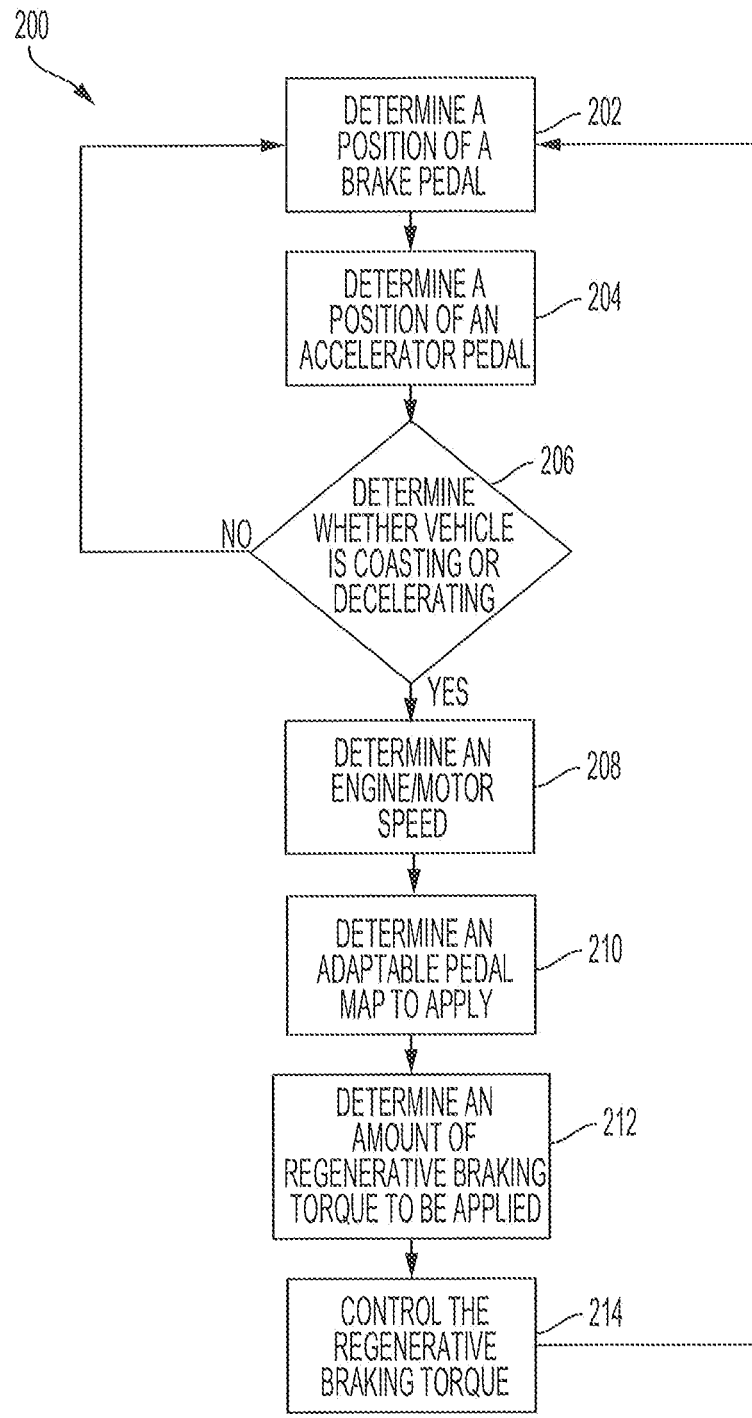
FIG. 2 is a flow diagram of an example process for controlling a regenerative braking torque that corresponds to a deceleration drive force when the vehicle is decelerating or coasting using the braking system of FIG. 1 according to an aspect of the invention.

FIG. 2 is a flow diagram of a process 200 for controlling a regenerative braking torque that corresponds to a deceleration drive force when the vehicle 102 is decelerating or coasting. One or more computers or one or more data processing apparatuses, for example, the ECU 106 of the braking system 100, appropriately programmed, may implement the process 200.

The braking apparatus 104 detects, obtains or otherwise determines a position of a brake pedal 112 (202). The braking system 100 detects, obtains or otherwise determines the position of the brake pedal 112 using the brake pedal sensor 116*b*. The brake pedal sensor 116*b* may detect the position of the brake pedal 112 over a period of time and indicate whether the brake pedal 112 is released, partially engaged and/or fully engaged. Moreover, the brake pedal sensor 116*b* may detect the percentage or amount that the brake pedal 112 is released, partially engaged and/or fully engaged.

The braking apparatus 104 detects, obtains or determines a position of an accelerator pedal 114 (204). The braking apparatus 104 detects, obtains or determines the position of the accelerator pedal 114 using the accelerator pedal sensor 116*a*. The accelerator pedal sensor 116*a* may detect the position of the accelerator pedal 114 over a period of time and indicate whether the accelerator pedal 114 is released, partially engaged and/or fully engaged. Moreover, the accelerator pedal sensor 116*a* may detect the percentage or amount that the accelerator pedal 114 is released, partially engaged and/or fully engaged. The braking apparatus 104 may use the position of the accelerator pedal 114 and the position of the brake pedal 112 to determine whether the vehicle 102 is decelerating and/or coasting.

The braking apparatus 104 determines whether a vehicle 102 is coasting or decelerating (206). The braking apparatus 104 may determine whether the vehicle 102 is coasting or decelerating based on the position of the accelerator pedal 114 and/or the position of the brake pedal 112. When the braking apparatus 104 determines that the brake pedal 112 is in the released positioned and the accelerator pedal 114 is in the released position, the braking apparatus 104 may determine that the vehicle is coasting and/or decelerating due to regenerative braking torque. When the braking apparatus 104 determines that the brake pedal 112 is partially engaged or fully engaged, the braking apparatus 104 may determine that the vehicle 102 is decelerating due to the mechanical braking caused by the depression of the brake pedal 112 and/or the regenerative braking torque. Otherwise, when the braking apparatus 104 determines that the brake pedal 112 is released and the accelerator pedal 114 is depressed the braking apparatus 104 may determine that the vehicle 102 is accelerating and not decelerating and not coasting.

If the braking apparatus 104 determines that the vehicle 102 is not coasting and not decelerating, such as when the vehicle 102 is accelerating, the braking apparatus 104 may continue to monitor the position of the brake pedal 112 and/or the position of the accelerator pedal 114 (202). Whereas, if the braking apparatus 104 determines that the vehicle 102 is decelerating or coasting, the braking apparatus 104 may obtain or determine an adaptable pedal map from among multiple adaptable pedal maps to use to determine an amount of engine regenerative braking torque to apply.

The braking apparatus 104 may detect, obtain or determine an engine/motor speed of the vehicle 102 (208). The braking apparatus 104 may use the engine/motor speed sensor 116*c* to determine the engine/motor speed of the vehicle 102. The engine/motor speed may be the rotating speed of the engine 130 and/or the motor and/or generator 118, which may affect the amount of regenerative braking torque necessary to slow or reduce the speed of the vehicle 102 when the vehicle 102 is coasting and/or decelerating.

Figure 3:
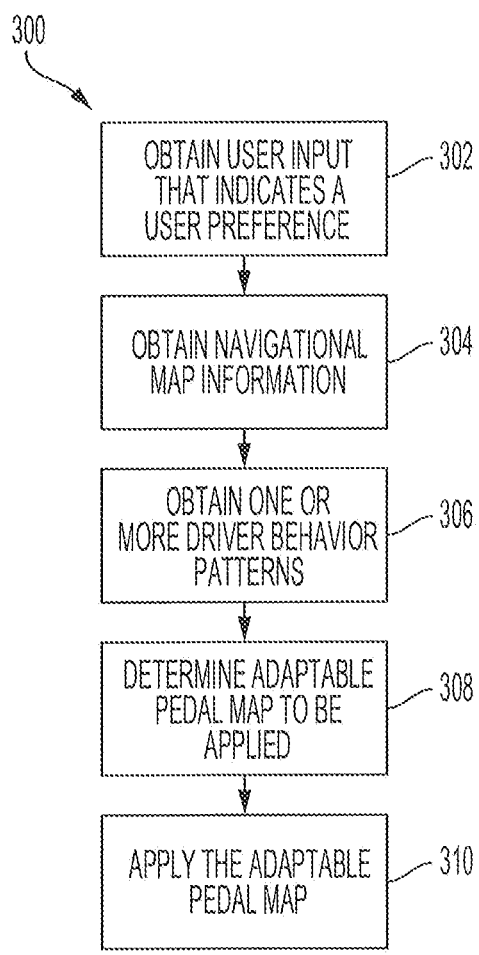
FIG. 3 is a flow diagram of an example process for determining the adaptable pedal map that controls a regenerative braking torque that corresponds to a deceleration drive force when the vehicle is decelerating or coasting using the braking system of FIG. 1 according to an aspect of the invention.
Figure 5A:
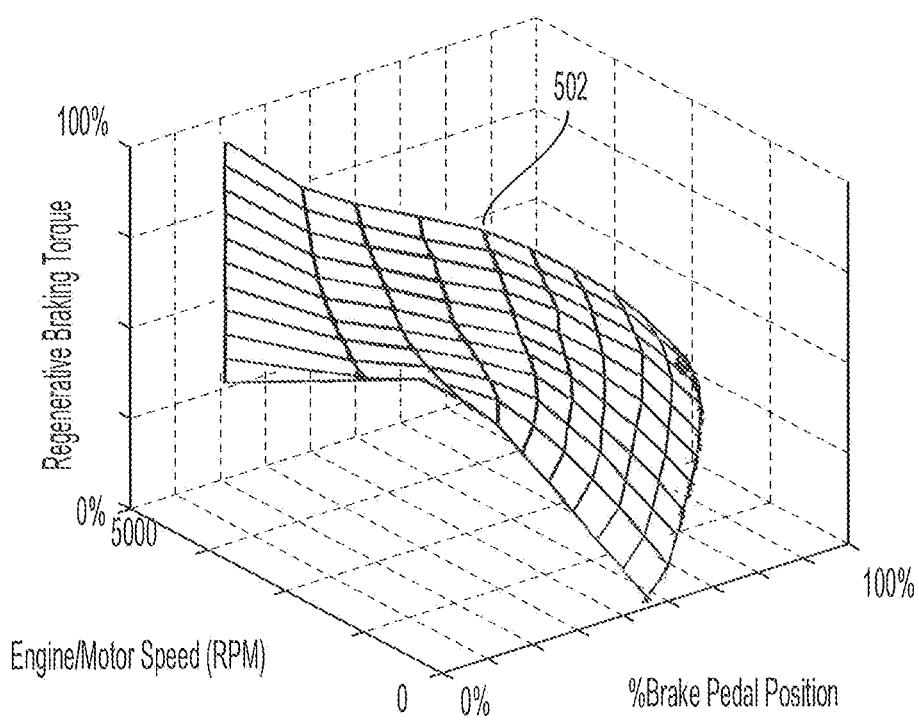
FIG. 5A shows an example adaptable pedal map used by the braking system of FIG. 1 to determine the regenerative braking torque according to an aspect of the invention.
Figure 5B:
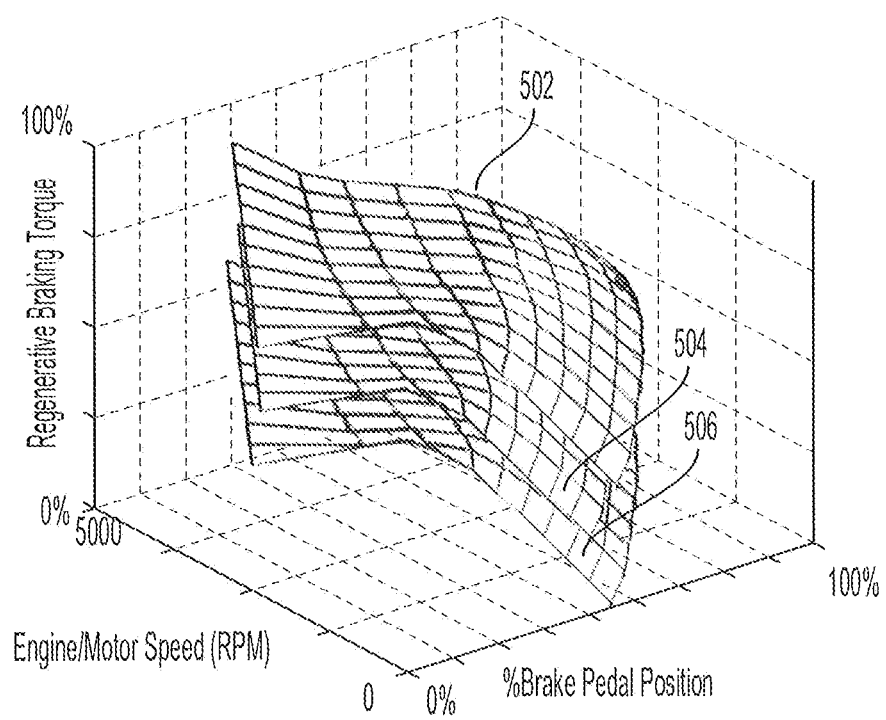
FIG. 5B shows example adaptable pedal maps used by the braking system of FIG. 1 to determine the regenerative braking torque according to an aspect of the invention.

The braking apparatus 104 obtains or determines an adaptable pedal map to apply to determine the amount of engine braking torque (210). The braking apparatus 104 may obtain and/or determine the adaptable pedal map from among multiple adaptable pedal maps stored in the memory 108. The memory 108 may store a single adaptable pedal map, as shown in FIG. 5A or multiple adaptable pedal maps, as shown in FIG. 5B, for example. Each of the adaptable pedal maps of the multiple adaptable pedal maps may have a different mapping of the regenerative braking torque, engine/motor speed and brake pedal position. An adaptable pedal map is a pedal map that continuously changes or adapts to driver or vehicle behavior patterns or user preferences of the driver of the vehicle 102. For example, the amount of regenerative braking torque associated with a position of the brake pedal 112 and/or the engine/motor speed changes based on the driver or vehicle behavior patterns and/or user or vehicle preferences. This allows the adaptable pedal map to match an engine's or a motor's feel to a driver's requirements. For a given brake pedal position and a given engine speed, the inverter 124 uses the adaptable pedal map to determine the regenerative braking torque that is to be generated and demanded from the driver. The inverter 124 indicates the demand to the motor and/or generator 118, which generates the regenerative braking energy that is stored and regenerative braking torque that is applied. FIG. 3 further describes the process for determining the particular adaptable pedal map from the multiple adaptable pedal maps to be applied.

The braking apparatus 104 determines an amount of regenerative braking torque to be applied (212). The braking apparatus 104 may determine the amount of regenerative braking torque based on the engine/motor speed, the adaptable pedal map and/or the position of the brake pedal 112, which corresponds to an amount of braking force. Given the amount of braking force or the position of the brake pedal 112 and the engine/motor speed, the braking apparatus 104 may map the braking force and the engine/motor speed to a regenerative braking torque to be applied using the adaptable pedal map.

The adaptable pedal map maps the engine/motor speed and the position of the brake pedal 112 with an amount of regenerative braking torque to be applied. The engine/motor speed may be directly correlated with the amount of regenerative braking torque, and the position of the brake pedal 112 may be inversely correlated with the amount of regenerative braking torque. For example, as the engine/motor speed of the vehicle 102 increases, the amount of regenerative braking torque to be applied increases (assuming the position of the brake pedal 112 is constant). And as the engine/motor speed of the vehicle 102 decreases, the amount of regenerative braking torque to be applied decreases (assuming the position of the brake pedal 112 is constant). In another example, as the position of the brake pedal 112 decreases to become released or disengaged, the amount of regenerative braking torque to be applied increases (assuming the engine/motor speed is constant). And as the position of the brake pedal 112 increases to become more engaged, the amount of regenerative braking torque to be applied decreases (assuming the engine/motor speed is constant).

Once the braking apparatus 104 determines the amount of regenerative braking torque to be applied, the braking apparatus 104 controls the regenerative braking torque based on the determined amount (214). For example, after the ECU 106 determines the amount of regenerative braking torque to be applied, the ECU 106 causes the inverter 124 to control the motor and/or generator 118 based on the determined amount of regenerative braking torque.

The ECU 106 may switch the inverter 124 on and off to control the amount of AC that is converted to DC to be stored in the battery 120 while simultaneously controlling the regenerative braking torque that is generated to slow the speed or motion of the vehicle 102. The ECU 106 may control the frequency, duty cycle or switching ratio of the inverter 124 between the on and off position and/or percentage of time that the inverter 124 is in the on or off position. For example, the ECU 106 may control the frequency and/or duration of switching of the inverter 124 so that DC is only converted from the AC and regenerative braking torque is generated and applied when the inverter 124 is on. As the amount of time that the inverter 124 is in the on position increases, the amount of regenerative braking torque and the amount of regenerative braking energy increases because the motor and/or generator 118 generates regenerative braking energy that may be provided to the battery 120 via the inverter 124 and generates the regenerative braking torque that is applied to slow the vehicle 102. And as the amount of time that the inverter 124 is in the off position increases, the amount of regenerative braking torque and the amount of regenerative braking energy decreases because the motor and/or generator 118 does not generate the regenerative braking energy via the inverter 124 and does not provide the regenerative braking torque for the deceleration force.

In some implementations, the ECU 106 may control the amount of energy that is provided by the inverter 124 to control the amount of regenerative braking torque. As the amount of energy that the inverter 124 provides increases, the amount of regenerative braking torque and the amount of regenerative braking energy increases. And as the amount of energy that the inverter 124 provides decreases, the amount of regenerative braking torque and the amount of regenerative braking energy decreases. This allows the braking apparatus 104 to control the amount of regenerative braking torque, which results in the slowing or deceleration of the vehicle 102. The braking apparatus 104 continues to monitor the state of the vehicle 102, such as the positions of the brake pedal 112 and/or the accelerator pedal 114, to continue to control the regenerative braking torque through the trip.

FIG. 3 is a flow diagram of a process 300 for determining the adaptable pedal map controlling a regenerative braking torque that corresponds to a deceleration drive force when the vehicle 102 is decelerating or coasting. One or more computers or one or more data processing apparatuses, for example, the ECU 106 of the braking system 100, appropriately programmed, may implement the process 300.

The braking apparatus 104 may obtain user input that indicates a user preference (302). The braking apparatus 104 may use the user interface 110 to obtain the user input that indicates one or more user preferences. The one or more user preferences may indicate whether the driver, user or other operator desires to have the adaptable pedal map turned on or otherwise initialized to adapt or adjust the regenerative braking torque continuously during the trip. The one or more user preferences may indicate a level of regenerative braking torque, such as between a low level and a high level of regenerative braking torque. For example, the one or more user preferences may indicate a desire for a high/strong, a medium/normal and/or a low/weak amount of regenerative braking or other supplemental braking to provide a virtual or a simulated Jake Braking functionality for an electric powertrain.

The braking apparatus 104 may obtain navigational map information (304). The braking apparatus 104 may use the navigation unit 128 to obtain the navigational map information, such as from the external database 134 via the network 132 and/or the network access device 126. The navigational map information may include a current location of the vehicle 102, a route of the vehicle 102 and/or one or more road features, such as highways, roadways, dirt roads, inclines, off-ramps, on-ramps, stop, yield or other traffic signals or signs or changes in gradation in the roadways that may affect driver behavior patterns or affect when a vehicle may coast, decelerate and/or accelerate. These road features may affect the driver behavior patterns, such as cause a driver to slow, coast or depress the brake pedal 112, and as such, the braking apparatus 104 may account or anticipate these changes to change or adjust the adaptable pedal map while driving.

The braking apparatus 104 may obtain one or more driver behavior patterns (306). The one or more driver behavior patterns may include the frequency, amount and/or rate that the driver depresses the brake pedal 112. As the rate of depression of the brake pedal 112 or frequency of braking increases, this may indicate that the driver is more prone or likely to brake, and thus, the braking apparatus 104 may use an adaptable pedal map with a higher range of regenerative braking force in response. And as the rate of depression of the brake pedal 112 or frequency of braking decreases, this may indicate that the driver is less prone or likely to brake, and thus, the braking apparatus 104 may use a different adaptable pedal map with a lower range of regenerative braking force in response.

The one or more driver behavior patterns may also include a frequency or degree that the windshield wipers are activated or turned on, which may indicate that there is precipitation or rain and/or a slippery road surface, and thus, the braking apparatus 104 may adjust the adaptable pedal map to increase the amount of regenerative braking torque or effectiveness when the road is slippery. The one or more driver behavior patterns may include an amount or frequency of switching between activation and deactivation of the Jake Brake switch, which may indicate that a driver is struggling to find a suitable Jake Brake feel or regenerative braking torque effectiveness. Other driver behavior patterns may include whether the driver is fatigued and/or the speed of the vehicle 102 over a time period. A driver who drives the vehicle at a lower speed or is less fatigued is less prone or likely to brake suddenly, and so, the braking apparatus 104 may use an adaptable pedal map with a lower range of regenerative braking force in response. A driver who drives the vehicle at a higher speed or is more fatigued is more prone or likely to brake suddenly, and so, the braking apparatus 104 may use a different adaptable pedal map with a higher range of regenerative braking force.

In some implementations, the driver behavior patterns may include an amount or a rate of change in the steering wheel when turning. A large amount or rate of change in the steering wheel while turning may indicate aggressive driving, which may be provide an indication that the driver is an aggressive driver who may stop frequently or depress the brake pedal 112 rapidly. Whereas, a small amount or rate of change in the steering wheel while turning may indicate more passive driving, which may provide an indication that the driver is less aggressive and has a tendency to prefer smooth controlled driving with more coasting and gradual deceleration. The driver behavior characteristics may affect the adaptable pedal map that is selected by the braking apparatus 104.

The braking apparatus 104 may obtain the one or more driver behavior patterns from the memory 108 and/or may obtain the one or more driver behavior patterns from the one or more sensors 116. For example, the braking apparatus 104 may determine when the driver is accelerating, decelerating, stopping or other behavior. The braking apparatus 104 may use the accelerator pedal sensor 116a to determine when the accelerator pedal 114 is depressed and correspondingly when the vehicle 102 is accelerating. The braking apparatus 104 may use the brake pedal sensor 116b to determine when the brake pedal 112 is depressed and correspondingly when the vehicle 102 is decelerating and/or stopping. The braking apparatus 104 may monitor the driver behavior over a period of time to determine various driver behavior patterns. For example, the braking apparatus 104 may determine the frequency, amount and/or rate that the driver depresses the brake pedal 112 to decelerate or stop the vehicle 102, the frequency and/or amount of switching on and off of the Jake Brake and/or windshield wiper. The braking apparatus 104 use the driver behavior patterns to determine the adaptable pedal map to use to determine the regenerative braking torque that is to be applied. Other sensors may be used to determine the fatigue of the driver.

In some implementations, the braking apparatus 104 may have previously associated and stored the driver behavior patterns of the driver at the current location of the vehicle 102 and/or at a location with similar road features surrounding the current location. And so, when the vehicle 102 approaches the current location and/or similar road features on a subsequent trip, the braking apparatus 104 may predict or anticipate the driver behavior patterns of the driver before the vehicle 102 traverses the location and obtain the driver behavior patterns of the driver specific to the current location and/or road features.

The braking apparatus 104 selects, obtains or determines an adaptable pedal map from among multiple adaptable pedal maps to be applied (308). The braking apparatus 104 may store in the memory and/or have any number of adaptable pedal maps. For example, the multiple adaptable pedal maps may include a first adaptable pedal map 502, a second adaptable pedal map 504 and a third adaptable pedal map 506, as shown in FIGS. 5A and 5B. The first adaptable pedal map 502 may have a first level or range of regenerative braking torque for an engine/motor speed and/or a position of the brake pedal 112. The first level or range of regenerative braking torque may be greater than a second level or range of regenerative braking torque and greater than a third level or range of regenerative braking torque. The second adaptable pedal map 504 may have the second level or range of regenerative braking torque. The second level or range of regenerative braking torque may be less than the first level or range of regenerative braking torque and greater than the third level or range of regenerative braking torque. The third adaptable pedal map 506 may have the third level or range of regenerative braking torque. The third level or range of regenerative braking torque may be less than the first level or range of regenerative braking torque and less than the third level or range of regenerative braking torque.

A level or range of regenerative braking torque that is greater than another level or range of regenerative braking torque may have a maximum amount of regenerative braking torque that is greater than the maximum amount of regenerative braking torque of the other level or range of regenerative braking torque and a minimum amount of regenerative braking torque that is greater than or equal to the minimum amount of regenerative braking torque of the other level or range of regenerative braking torque. A level or range of regenerative braking torque that is less than another level or range of regenerative braking torque may have a maximum amount of regenerative braking torque that is less than the maximum amount of regenerative braking torque of the other level or range of regenerative braking torque and a minimum amount of regenerative braking torque that is less than or equal to the minimum amount of regenerative braking torque of the other level or range of regenerative braking torque. The different levels or ranges of regenerative braking torque may or may not have overlap.

The braking apparatus 104 selects, obtains or determines the adaptable pedal map to be applied based on the navigational map information, the driver behavior patterns and/or the user input. The braking apparatus 104 may select, obtain or determine the adaptable pedal map to be applied based on solely the driver behavior pattern, the user input or the navigational map information and/or a combination of the driver behavior pattern, the user input and/or the navigational map information.

Figure 4:
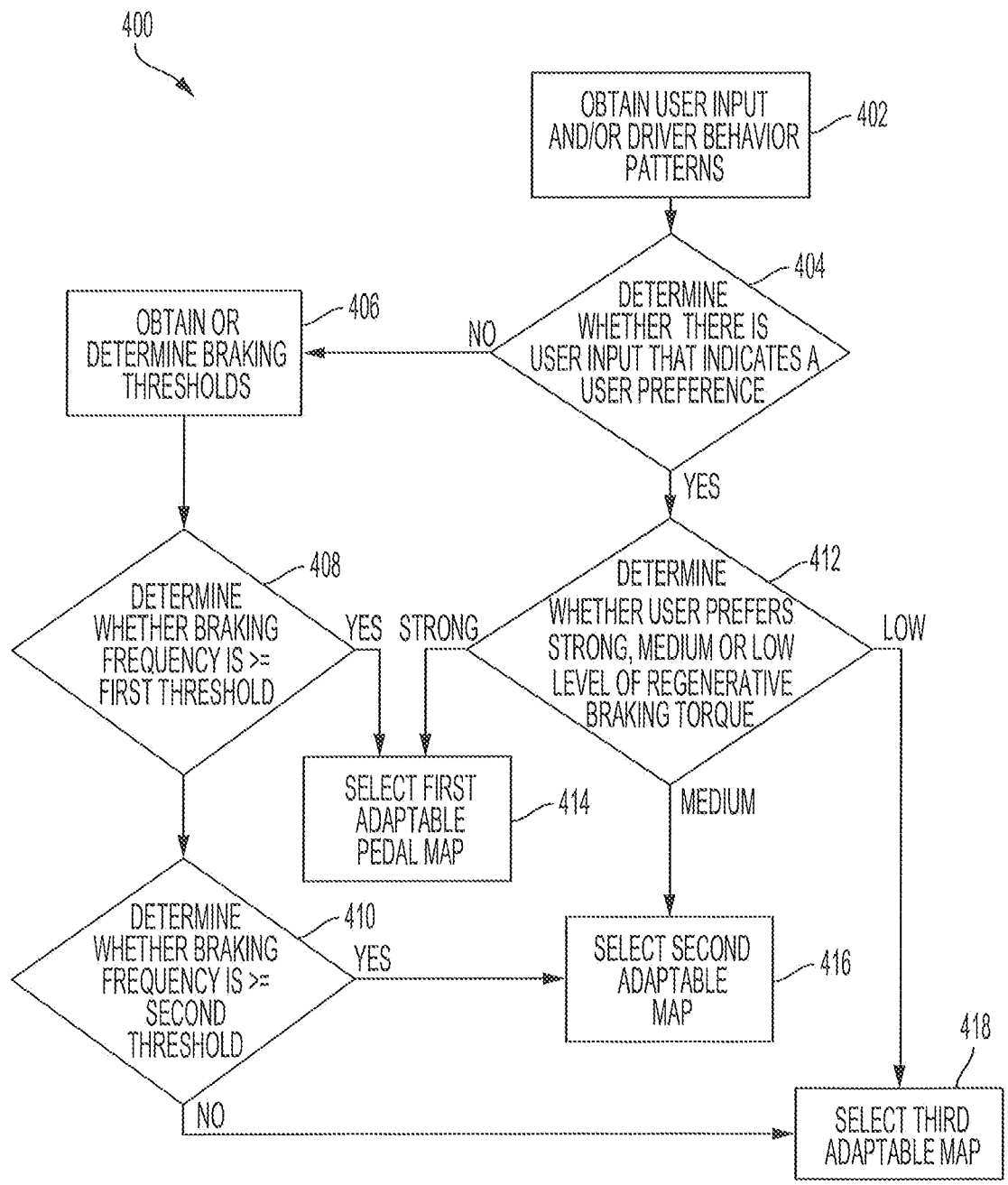
FIG. 4 is a flow diagram of an example process for determining the adaptable pedal map based on either the driver behavior pattern or the user input that is used by the braking system of FIG. 1 according to an aspect of the invention.

For example, the braking apparatus 104 may select a first adaptable pedal map 402 when the user input indicates that the user preference is for a high/strong amount of regenerative braking and/or when the driver behavior patterns indicate that the driver has a frequency of depressing the brake pedal 112 more than a first threshold amount that is greater than a second threshold amount. In another example, the braking apparatus 104 may select a second adaptable pedal map 504 when the user input indicates that the user preference is for a medium/normal amount of regenerative braking and/or when the driver behavior patterns indicate that the driver has a frequency of depressing the brake pedal 112 more than a second threshold amount but less than a first threshold amount. In another example, the braking apparatus 104 may select a third adaptable pedal map 506 when the user input indicates that the user preference is for a low/weak amount of regenerative braking and/or when the driver behavior patterns indicate that the driver has a frequency of depressing the brake pedal 112 that is less than a first threshold amount and a second threshold amount. FIG. 4 further describes a process for the selection among the various adaptable pedal maps.

In some implementations, the braking apparatus 104 may select, obtain or determine the adaptable pedal map to be applied based on the navigational map information including the current location of the vehicle 102 and/or the one or more road features. For example, the navigational map information may indicate that one or more road features are present in the roadway along the route of the vehicle 102 and/or one or more weather features are present. And so, when the navigational map information indicates that the vehicle 102 is traveling downhill and/or raining where the driver is more likely to depress the brake pedal 112 and/or not likely to depress the accelerator pedal 114, the braking apparatus 104 may automatically select an adaptable pedal map that has a higher range of regenerative braking torque. And, when the navigational map information indicates that the vehicle 102 is traveling uphill and/or there is no rain where the driver is less likely to depress the brake pedal 112, the braking apparatus 104 may select another adaptable pedal map that has a lower range of regenerative braking torque.

Once the adaptable pedal map is selected, the braking apparatus 104 applies the selected or determined adaptable pedal map to control the regenerative braking torque (310). The braking apparatus 104 applies the selected or determined adaptable pedal map to control the regenerative braking torque to apply when the vehicle 102 is coasting and/or decelerating, as described above.

FIG. 4 is an example flow diagram of a process 400 for determining the adaptable pedal map based on the driver or vehicle behavior pattern or the user input. One or more computers or one or more data processing apparatuses, for example, the ECU 106 of the braking system 100, appropriately programmed, may implement the process 400.

The braking apparatus 104 may obtain user input and/or driver or vehicle behavior patterns, as described above (402). Once the braking apparatus 104 has obtained the user input and/or the driver or vehicle behavior patterns, the braking apparatus 104 may determine whether there is user input that includes one or more configuration settings that indicates one or more user preferences for the amount of regenerative braking to be applied (404). When there is user input that indicates a user preference, the braking apparatus 104 may select or determine the adaptable pedal map to be used based on the user input. When there is no user input that indicates a user preference, the braking apparatus 104 may select or determine the adaptable map to be used based on the driver or vehicle behavior patterns. In some implementations, the braking apparatus 104 may select or determine the adaptable pedal map to be used based on a combination of the user input and/or driver or vehicle behavior patterns.

When the braking apparatus 104 determines that there is user input that indicates a user preference, the braking apparatus 104 may determine whether the user prefers a high/strong, a medium/normal and/or a low/weak level or amount of regenerative braking torque (412). The braking apparatus 104 extracts the one or more configuration settings from the user input and determines the user preference based on the one or more configuration settings. The braking apparatus 104 may select the first adaptable pedal map 502 when the one or more configuration settings indicate that the user preference is for a high/strong level or amount of regenerative braking torque (414). The braking apparatus 104 may select the second adaptable pedal map 504 when the one or more configuration settings indicate that the user preference is for a medium/normal level or amount of regenerative braking torque (416). And the braking apparatus 104 may select the third adaptable pedal map 506 when the one or more configurations settings indicate that the user preference is for a low/weak level or amount of regenerative braking torque (418).

When the braking apparatus 104 determines that there is no user input that indicates a user preference, the braking apparatus 104 may obtain or determine one or more braking thresholds (406). The one or more braking thresholds may be predetermined, user-configured or based on a current location of the vehicle 102 or road features of the roadway that may affect the amount or frequency of braking. For example, the one or more braking thresholds may be different when the vehicle 102 is traveling uphill, downhill, on an on-ramp or off-ramp or other road feature that may affect the amount or frequency of braking by the driver of the vehicle 102.

The braking apparatus 104 may determine whether the frequency of braking is greater than or equal to a first threshold (408). The first threshold may be representative of a high threshold that reflects a significant or an excessive amount of braking to slow or stop the vehicle 102. If the braking apparatus 104 determines that the frequency of braking is greater than or equal to the first threshold, the braking apparatus 104 may select the first adaptable pedal map (414).

Otherwise, if the braking apparatus 104 determines that the frequency of braking is less than the first threshold, the braking apparatus 104 may determine whether the frequency of the braking is greater than or equal to the second threshold (410). The second threshold may be representative of a medium threshold that reflects a normal amount of braking to slow or stop the vehicle 102. If the braking apparatus 104 determines that the frequency of braking is greater than or equal to the second threshold and less than the first threshold, the braking apparatus 104 may select the second adaptable pedal map (416).

Otherwise, if the braking apparatus 104 determines that the frequency of braking is less than second threshold and the first threshold, the braking apparatus may select the third adaptable pedal map (418). Each adaptable pedal map may be associated with different ranges of regenerative braking torque that may be used to slow or stop the vehicle 102 during coasting and/or deceleration. By selecting different adaptable pedal maps, the braking apparatus 104 adjusts the regenerative braking torque and the corresponding deceleration force to adjust the feel or engagement of the driver of the vehicle 102 to decelerate the vehicle 102 using the regenerative braking torque and minimize the use of mechanical braking and the need to depress the brake pedal 112.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:
1. A braking system, comprising:
an electric motor that is configured to generate regenerative energy and provide a regenerative braking torque;
a memory configured to store a plurality of pedal maps, each pedal map having a different mapping of regenerative braking torque, engine or motor speed, and brake pedal position; and
an electronic control unit coupled to the electric motor and the memory and configured to:
select a pedal map from the plurality of pedal maps,
determine an amount of the regenerative braking torque to be applied based on the selected pedal map and an amount of braking force, and
control an amount of the regenerative braking torque to be applied.

2. The braking system of claim 1, further comprising:
a brake pedal sensor configured to detect the brake pedal position that corresponds to the amount of braking force.

3. The braking system of claim 2, wherein the amount of regenerative braking torque is inversely proportional to the amount of braking force.

4. The braking system of claim 1, wherein the electronic control unit is configured to select the pedal map from the plurality of pedal maps based on driver behavior patterns.

5. The braking system of claim 4, wherein the driver behavior patterns include a frequency of depression of a brake pedal.

6. The braking system of claim 1, wherein the electronic control unit is configured to select the pedal map based on user input that indicates a selection of an amount of regenerative braking to be used.

7. The braking system of claim 1, further comprising:
an inverter coupled to the electric motor and configured to control the regenerative braking torque of the electric motor;
wherein the inverter is configured to control the regenerative braking torque of the electric motor based on the amount of regenerative braking torque to be applied and convert alternating current (AC) obtained from the electric motor into direct current (DC) that is stored in a battery of a vehicle.

8. A braking system, comprising:
an electric motor that is configured to generate regenerative energy and provide a regenerative braking torque;
an inverter coupled to the electric motor and configured to control the regenerative braking torque of the electric motor;
a memory configured to store a plurality of pedal maps, each pedal map having a different mapping of regenerative braking torque, engine or motor speed, and brake pedal position; and
an electronic control unit coupled to the inverter and the memory and configured to:
select a pedal map from the plurality of pedal maps,
determine an amount of the regenerative braking torque to be applied based on the selected pedal map and an amount of braking force, and
provide a signal that indicates the amount of regenerative braking torque to be applied.

9. The braking system of claim 8, wherein the electronic control unit is configured to select the pedal map from the plurality of pedal maps based on driver behavior patterns.

10. The braking system of claim 9, wherein the driver behavior patterns include a frequency of depression of a brake pedal.

11. The braking system of claim 8, further comprising:
a brake pedal sensor configured to detect the brake pedal position that corresponds to the amount of braking force.

12. The braking system of claim 8, wherein the amount of regenerative braking torque is inversely proportional to the amount of braking force.

13. The braking system of claim 8, wherein the electronic control unit is configured to select the pedal map based on user input that indicates a selection of an amount of regenerative braking to be used.

14. A method of controlling a deceleration force of a vehicle, comprising:
storing, in a memory, a plurality of pedal maps, each pedal map having a different mapping of regenerative braking torque, engine or motor speed, and brake pedal position;
determining, by a processor, that the vehicle is coasting or decelerating;
selecting, by the processor, a pedal map from the plurality of pedal maps;
determining, by the processor, the amount of regenerative braking torque to be applied based on the selected pedal map; and
controlling, by the processor and using an inverter, the amount of regenerative braking torque.

15. The method of claim 14, wherein selecting the pedal map from the plurality of pedal maps is based on driver behavior patterns.

16. The method of claim 15, wherein the driver behavior patterns include a frequency of depression of a brake pedal.

17. The method of claim 14, further comprising:
detecting the brake pedal position that corresponds to an amount of braking force, wherein the determining the amount of regenerative braking torque to be applied is further based on the amount of braking force.

* * * * *